(12) United States Patent
Nagazumi

(10) Patent No.: US 6,381,261 B1
(45) Date of Patent: Apr. 30, 2002

(54) RANDOM PULSE TYPE RADAR APPARATUS

(75) Inventor: Yasuo Nagazumi, 6-10, Meguro 4-chome, Meguro-ku, Tokyo (JP), 153-0063

(73) Assignees: G.D.S. Co., Ltd.; Yasuo Nagazumi, both of Tokyo (JP)

( * ) Notice: Subject to any disclaimer, the term of this patent is extended or adjusted under 35 U.S.C. 154(b) by 0 days.

(21) Appl. No.: 09/197,696

(22) Filed: Nov. 23, 1998

(30) Foreign Application Priority Data

Nov. 27, 1997 (JP) .............................................. 9-342056

(51) Int. Cl.[7] .......................... H04B 15/00; H04K 1/00; H04L 27/30
(52) U.S. Cl. ...................... 375/138; 342/130; 342/131; 342/201; 375/130; 375/131
(58) Field of Search ................................. 375/138, 130, 375/131, 135, 140, 308, 303; 342/130, 131, 132, 201

(56) References Cited

U.S. PATENT DOCUMENTS

| 5,610,907 | A | * | 3/1997 | Barrett | 370/342 |
| 5,828,333 | A | * | 10/1998 | Richardson et al. | 342/70 |
| 5,995,534 | A | * | 11/1999 | Fullerton et al. | 375/200 |
| 6,154,482 | A | * | 11/2000 | Inuzuka | 375/130 |

FOREIGN PATENT DOCUMENTS

| EP | 0336273 A2 | 10/1989 | |
| EP | 0714035 A1 | 5/1996 | |
| JP | B2 2655374 | 5/1997 | ............ H04J/13/00 |

* cited by examiner

Primary Examiner—Mohammad H. Ghayour

(57) ABSTRACT

A random pulse type radar apparatus sends out as an output signal a spectrum spread radio wave including a pseudo random signal-less period and receives echoes in this signal-less period to thereby significantly reduce transmission peak power. The random pulse type radar apparatus comprises a transmitter for generating a hybrid type spectrum spread signal by simultaneously using two kinds of modulations which are phase shift keying modulation for selecting a phase of a transmission radio wave in accordance with a pseudo noise digital code and outputting the transmission wave, and time hopping modulation for stopping transmission of a radio wave at random in accordance with the pseudo noise digital code; a receiving unit for selectively detecting an echo of a transmission signal radio wave, generated by the transmitter, from a target with a time delay; at least one a common antenna unit for use both for transmission and reception or antenna units installed close to each other and respectively serving single functional units; and a reception control unit for stopping an action of the receiving unit in a time zone in which the transmitter is outputting radio waves in accordance with the time hopping modulation, whereby a spatial distribution of an intensity of an echo of a transmitted radio wave is measured through computation of a cross-correlation function of a transmission signal and a reception signal.

12 Claims, 6 Drawing Sheets

FIG. 1

-PPP-PP----N-NN-N--P-NNNPN----P--PN--N-N---P-NP-PNPN-NN-PP----NNN-PP--N-P-N---P
-N-P---P-NPP--N--N-N---P--PNP---P-PNN-PN-P-PNP-

FIG. 6
PRIOR ART
(a) 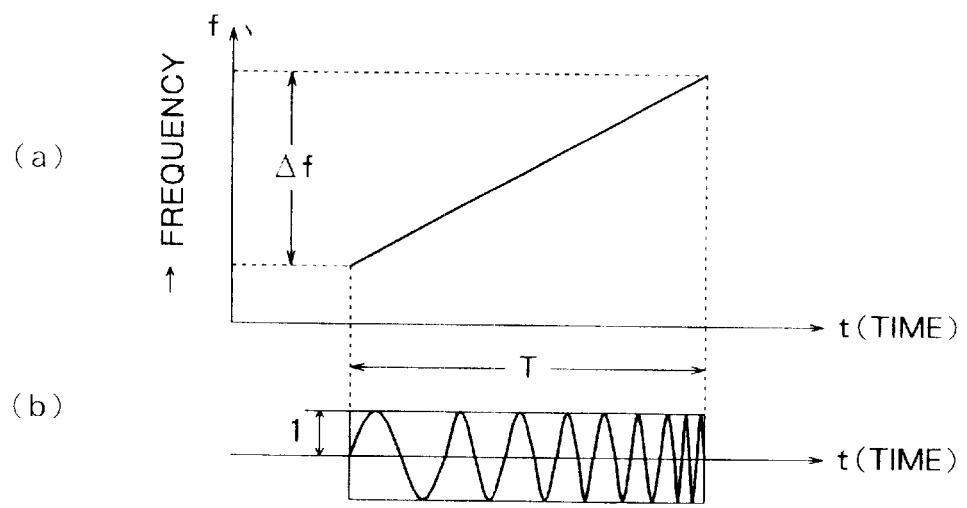
(b) 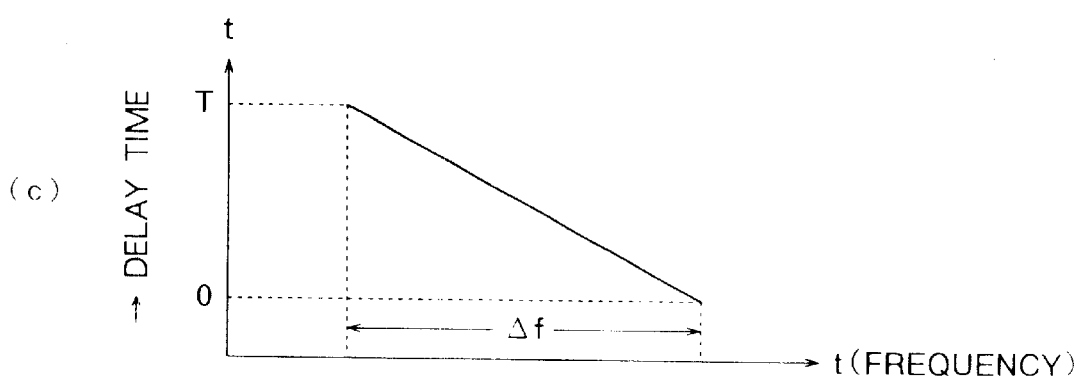
(c) 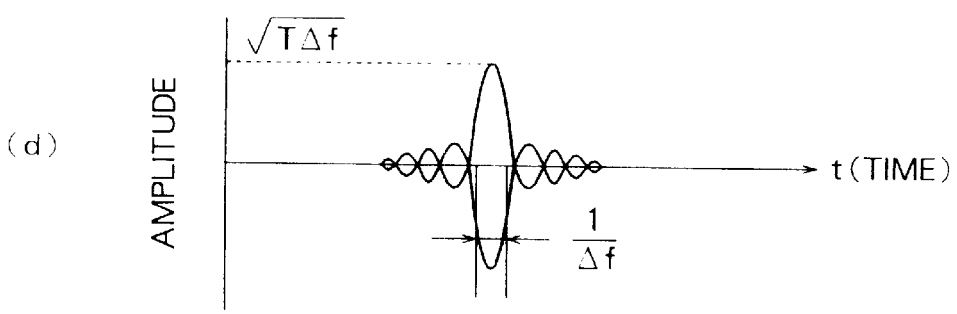
(d)

FIG. 7
PRIOR ART
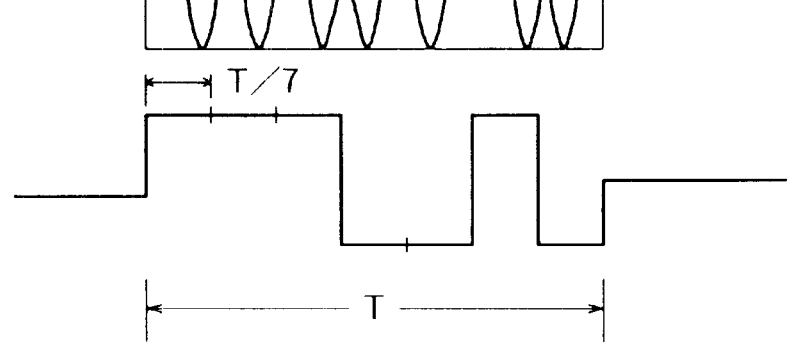
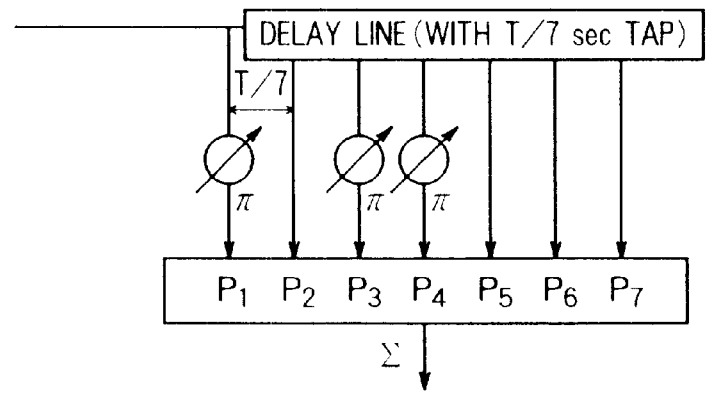
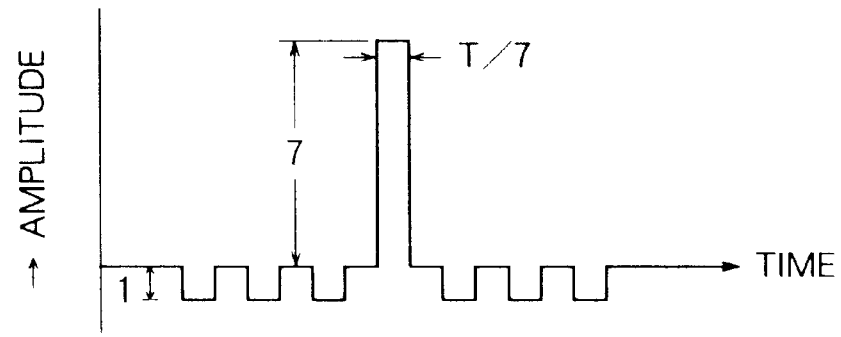

RANDOM PULSE TYPE RADAR APPARATUS

BACKGROUND OF THE INVENTION

1. Field of the Invention

The present invention relates to a random pulse type radar apparatus for use in vessels, airplanes, automobiles, missiles and so forth.

2. Description of the Related Art

A conventional typical pulse radar apparatus mainly comprises a transmitter which transmits electromagnetic pulse wave energy at given time intervals, and a receiving unit which continuously monitors echo energy of the transmitted energy.

Because the monitorable distance range of this system is a half the distance acquired by dividing the propagation speed of radio waves by the time interval of output pulses, this system cannot detect echo signals from a target which is located at a greater distance than this monitorable range.

This necessitates that the intensity of the output radio waves should be powerful enough to be dangerous to human bodies, such as radiation at a very close range. In this respect, radar usage has been managed through the license system.

A CW radar, which continuously sends out transmission radio waves and utilizes interference of the radio waves with their echoes from a target, has been put to a practical use. While the CW radar is mainly used to measure the moving speed of a target, the target position can be measured by additionally using frequency wobble. The CW radar is hardly used except for a special application.

A pulse compression radar apparatus of the type that sends out a chirped pulse signal, which is one type of spectrum spread signal, or a BPSK signal of a digital code like a barker code, as an output signal in a short period of time is also used for a special application. This radar apparatus does not differ essentially from the typical pulse radar, and suffers a limited effect of reducing the peak power. In a case of using a BPSK signal, for example, if one tries to reduce the peak power by increasing the transmission time, physical measurement of echoes from a target at a very close range is not possible due to the short reciprocation time of radio waves (see FIGS. 6 and 7).

As pleasure-boats become popular, a radar apparatus which can be used without any danger and special knowledge is strongly demanded from a viewpoint of preventing sea accidents. Such a radar apparatus is not actually available on the market because there are no adequate technical schemes.

It is known that the precision of measuring the distance by a radar becomes higher in proportion to the band width of radio waves that are generally used.

In the field of radio communication, the direct sequence (DS) system which employs PSK (Phase Shift Keying) modulation by using recursive code sequences and the frequency hopping (FH) system which switches transmission frequencies at a high speed have already been used widely as schemes of generating wide-band radio waves.

When radio waves of those systems are adapted for a radar usage, the peak of the transmission radio waves becomes minimum but the radio waves are output continuously. In a case of a radar apparatus in which its antenna is used as both the transmission antenna and reception antenna, however, masking of radio waves by the transmission signals makes it substantially impossible to receive very weak echoes.

Accordingly, it is an object of the present invention to significantly reduce transmission peak power by employing a system, which is disclosed in Japanese Patent No. 2655374, entitled "Spectrum Spread Communication Equipment", by the same applicant as that of this invention and which sends out as an output signal a spectrum spread radio wave including a "signal-less period" set at a pseudo random and receives echoes in this "signal-less period".

SUMMARY OF THE INVENTION

To achieve the object, a random pulse type radar apparatus according to this invention comprises a transmitter for generating a hybrid type spectrum spread signal by simultaneously using two kinds of modulations which are phase shift keying (PSK) modulation for selecting a phase of a transmission radio wave in accordance with a pseudo noise digital code and outputting the transmission wave, and time hopping modulation for stopping transmission of a radio wave at random in accordance with the pseudo noise digital code; a receiving unit for selectively detecting an echo of a transmission signal radio wave, generated by the transmitter, from a target with a time delay; at least one a common antenna unit for use both for transmission and reception or antenna units installed close to each other and respectively serving single functional units; and a reception control unit for stopping an action of the receiving unit in a time zone in which the transmitter is outputting radio waves in accordance with the time hopping modulation, whereby a spatial distribution of an intensity of an echo of a transmitted radio wave is measured through computation of a cross-correlation function of a transmission signal and a reception signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 shows a time sequence consisting of three kinds of modulation states of a positive phase (P), a negative phase (N) and no signal (−) according to one embodiment of this invention;

FIG. 6 is an explanatory diagram of a conventional pulse compression radar of a linear frequency modulation system; and FIG. 7 is an explanatory diagram of a conventional coded pulse radar.

DETAILED DESCRIPTION OF THE PREFERRED EMBODIMENTS

The constitution and operation of a preferred embodiment of the present invention will now be described referring to FIGS. 1 through 5.

Figure 2:
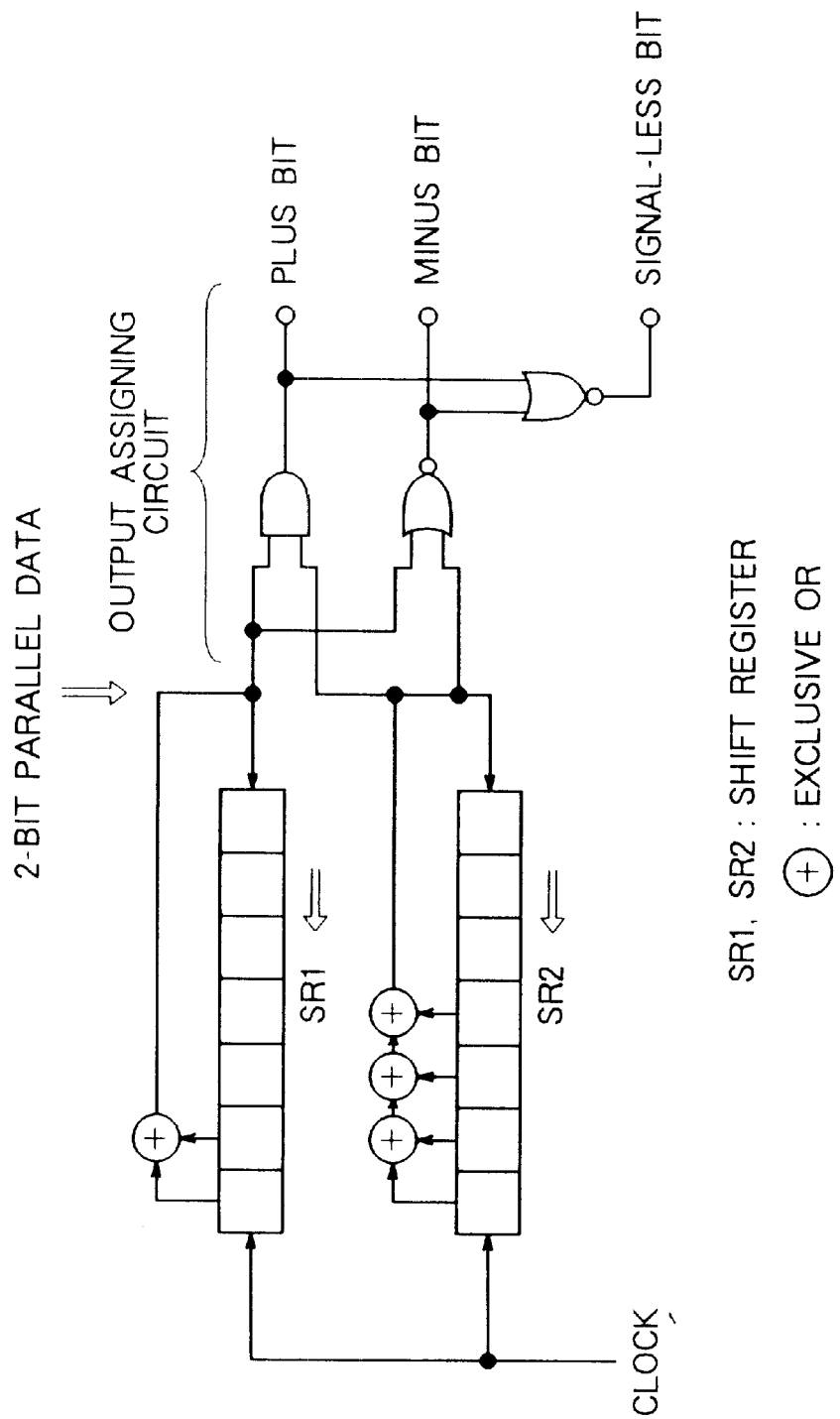
FIG. 2 depicts a circuit for generating a time sequence consisting of three kinds of modulation states of a positive phase (P), a negative phase (N) and no signal (−) according to one embodiment of this invention.

FIGS. 1 and 2 exemplify a time sequence consisting of three kinds of modulation states of a positive phase (P), a negative phase (N) and no signal (−) and a circuit for generating the time sequence, both being similar to those disclosed in Japanese Patent No. 2655374 entitled "Spectrum Spread Communication Equipment".

In a case of using this time sequential signals as transmission radio waves of a radar, approximately a half of 127 chip codes are located in a signal-less period where transmission of a radio wave is stopped and detection of coming radio waves is possible (this period will be hereinafter called "window").

As apparent from FIG. 1, this window is distributed at a pseudo random, so that about a half the energy of each echo can always be observed through this window in this example.

It is obvious that the aperture rate of this window can be adjusted almost arbitrarily by controlling the mixing ratio of signal-less segments in the time sequential signal in FIG. 1.

Figure 3:
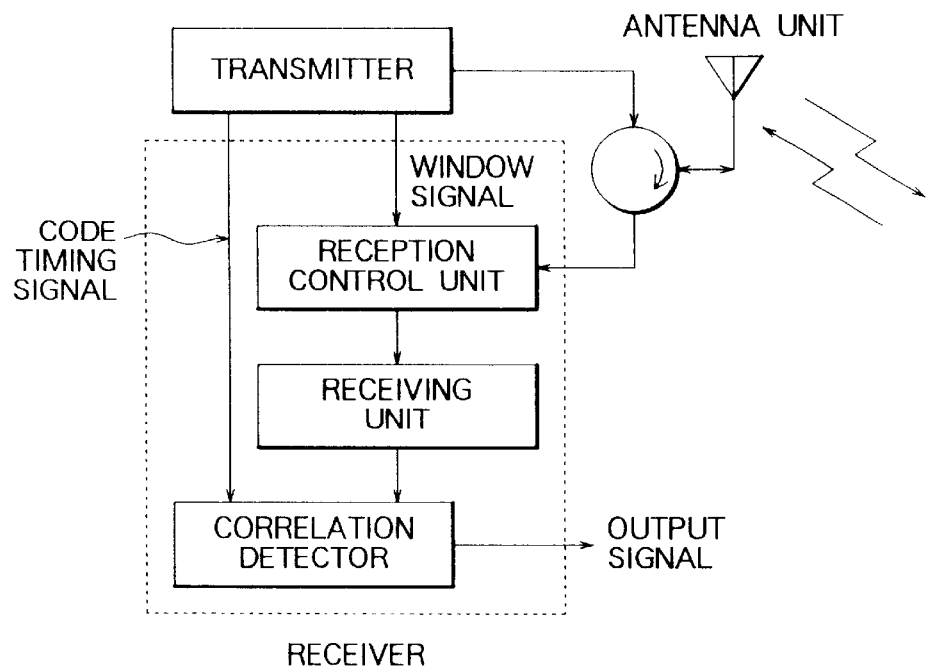
FIG. 3 is a block diagram showing the simplest constitution that accomplishes the function of this embodiment.

FIG. 3 exemplifies the simplest constitution that accomplishes the above-described function.

In FIG. 3, the output of the transmitter is transmitted outside as a radio wave via an antenna unit which has a directivity. At the same time, the transmitter sends a timing signal indicating a window (hereinafter called "window signal") and a signal indicating the phase reference of a code to the receiver.

When the relationship between the phase reference of a code and the window is fixed previously, it is of course sufficient to supply just one of the two signals to the receiver.

Only while the transmitter is not implementing transmission, the receiver receives a radio wave and supplies it, after down conversion, as an input to a correlation detector like a matched filter, which is comprised of an acoustic surface wave element, for measuring cross-correlation with a transmitted code.

While the autocorrelation function of a window signal is ideally 1 when $\tau=0$ and 0 otherwise, the window signal may show a non-negligible autocorrelation value depending on the scheme of forming the window signal, when $\tau$ is other than 0.

The utilization factor of transmission radio waves therefore varies for each phase of a code. As this utilization factor is predictable in advance, it can be compensated by adjusting the gain of the correlation detector or through digital processing after transmission.

Figure 4:
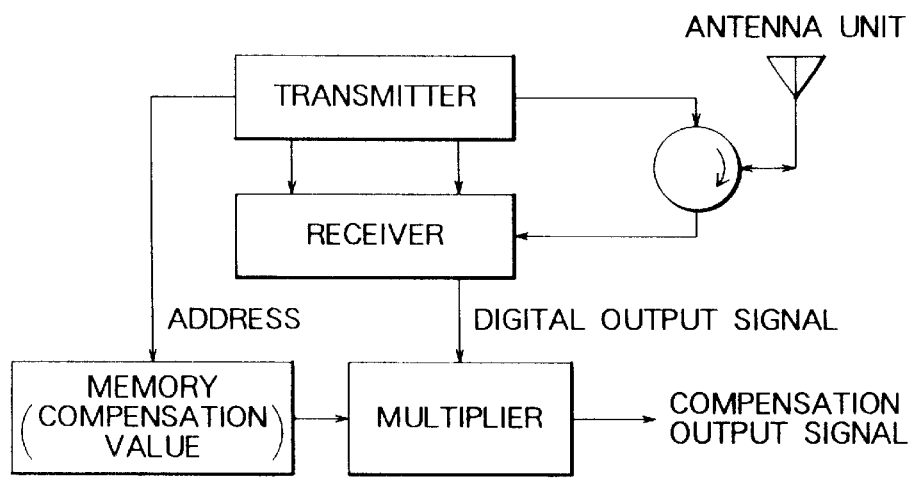
FIG. 4 is a block diagram showing a constitution in a case where the output signal of a receiver according to this embodiment is compensated through digital processing.

FIG. 4 exemplifies a case where the output signal of the receiver is compensated through digital processing.

In FIG. 4, the digital output signal from the receiver is supplied to one input terminal of a multiplier. An output compensation value corresponding to each code phase, output from a memory, is supplied to the other input terminal of the multiplier in synchronism with a code timing signal output from the transmitter. A compensation output signal is computed as the multiplication output of the multiplier.

The output compensation value contains the autocorrelation value of the window signal that has been used in transmission. The output compensation value is so set as to be large when the autocorrelation value is high or the window is narrow, and to be small when the autocorrelation value is low, and serves to cancel the influence of the window size on each code phase.

Figure 5:
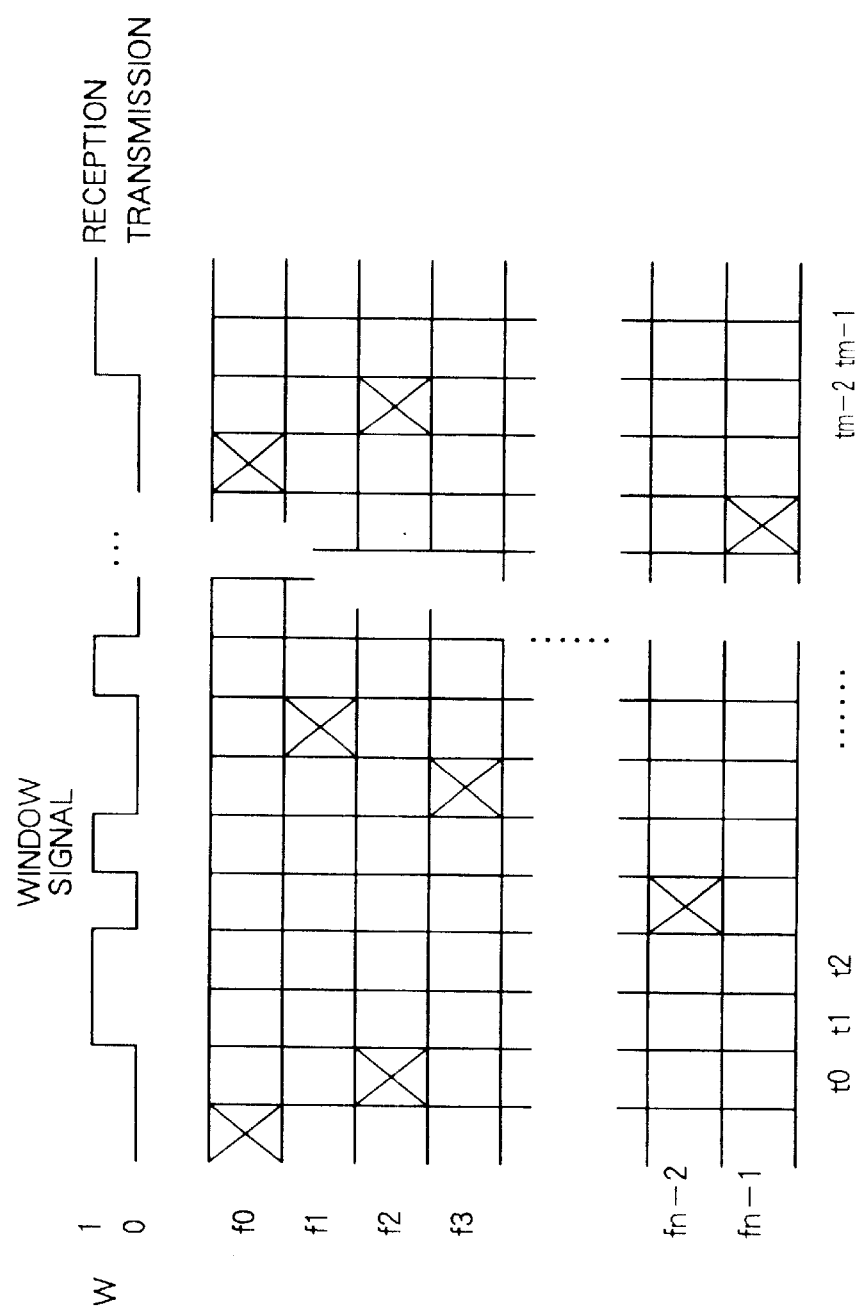
FIG. 5 exemplifies the constitution of a transmission signal according to another embodiment of this invention wherein FSK (Frequency Shift Keying) is used instead of PSK to construct the transmission signal.

FIG. 5 exemplifies the constitution of a transmission signal in a case where FSK is used instead of PSK to constitute the transmission signal.

In FIG. 5, the horizontal scale represents the time and either one of n types of frequencies and a signal-less state is assigned to each of m time slots ti.

The window signal that is denoted by "W" becomes 1 in a signal-less state and indicates that none of the n types of frequencies is not transmitted in this state.

In the period of W=0, on the other hand, a signal of one of the frequencies, fj, is transmitted. The hatching in the diagram indicates the transmission state.

Since this radar apparatus can significantly increase the transmission time of radio waves as compared with the conventional radar apparatus designed for position measurement, the radar apparatus can exhibit an effect of reducing the peak power of transmission radio waves and is easy to handle.

The entire disclosure of Japanese Patent Application No. 9-342056 filed on Nov. 27, 1997 including the specification, claims, drawings and summary are incorporated herein by reference in its entirety.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A random pulse type radar apparatus comprising:
 a transmitter for generating a hybrid type spectrum spread signal by simultaneously using two kinds of modulations which are phase shift keying (PSK) modulation for selecting a phase of a transmission radio wave in accordance with a pseudo noise digital code and outputting said transmission wave, and time hopping modulation for stopping transmission of a radio wave at random in accordance with said pseudo noise digital code;
 a receiving unit for selectively detecting an echo of a transmission signal radio wave, generated by said transmitter, from a target with a time delay;
 at least one a common antenna unit for use both for transmission and reception or antenna units installed close to each other and respectively serving single functional units; and
 a reception control unit for stopping an action of said receiving unit in a time zone in which said transmitter is outputting radio waves in accordance with said time hopping modulation,
 whereby a spatial distribution of an intensity of an echo of a transmitted radio wave is measured through computation of a cross-correlation function of a transmission signal and a reception signal.

2. A random pulse type radar apparatus comprising:
 a transmitter for generating a hybrid type spectrum spread signal by simultaneously using two kinds of modulations which are frequency shift keying (FSK) modulation for selecting a frequency of a transmission radio wave in accordance with a pseudo noise digital code and outputting said transmission wave, and time hopping modulation for stopping transmission of a radio wave at random in accordance with said pseudo noise digital code;
 a receiving unit for selectively detecting an echo of a transmission signal radio wave, generated by said transmitter, from a target with a time delay;

at least one common antenna unit for use both for transmission and reception or antenna units installed close to each other and respectively serving single functional units; and a reception control unit for stopping an action of said receiving unit in a time zone in which said transmitter is outputting radio waves in accordance with said time hopping modulation, whereby a spatial distribution of an intensity of an echo of a transmitted radio wave is measured through computation of a cross-correlation function of a transmission signal and a reception signal.

3. The random pulse type radar apparatus according to claim 1, wherein as said hybrid type spectrum spread signal, a modulation state is determined by assigning a value of parallel data of two or more bits, obtained from values of individual sample points of PN (Pseudo Noise) code sequences of a binary or greater system, to a plurality of modulation states provided by adding a signal-less state added to individual phase states of phase shift keying (PSK).

4. The random pulse type radar apparatus according to claim 3, wherein a constant portion of a time zone where each modulation state assigned is maintained, is further assigned to a signal-less state.

5. The random pulse type radar apparatus according to claim 1, wherein a reception sensitivity or a reception signal level is compensated in accordance with a value of an autocorrelation function indicated by digital codes used in said time hopping modulation.

6. The random pulse type radar apparatus according to claim 2, wherein a reception sensitivity or a reception signal level is compensated in accordance with a value of an autocorrelation function indicated by digital codes used in said time hopping modulation.

7. The random pulse type radar apparatus according to claim 3, wherein a reception sensitivity or a reception signal level is compensated in accordance with a value of an autocorrelation function indicated by digital codes used in said time hopping modulation.

8. The random pulse type radar apparatus according to claim 4, wherein a reception sensitivity or a reception signal level is compensated in accordance with a value of an autocorrelation function indicated by digital codes used in said time hopping modulation.

9. The random pulse type radar apparatus according to claim 1, wherein a code sequence like a maximal linear code sequence (M-sequence) indicating an approximately constant autocorrelation value except when code phase matching occurs is used as digital codes used in said time hopping modulation.

10. The random pulse type radar apparatus according to claim 2, wherein a code sequence like a maximal linear code sequence (M-sequence) indicating an approximately constant autocorrelation value except when code phase matching occurs is used as digital codes used in said time hopping modulation.

11. The random pulse type radar apparatus according to claim 3, wherein a code sequence like a maximal linear code sequence (M-sequence) indicating an approximately constant autocorrelation value except when code phase matching occurs is used as digital codes used in said time hopping modulation.

12. The random pulse type radar apparatus according to claim 4, wherein a code sequence like a maximal linear code sequence (M-sequence) indicating an approximately constant autocorrelation value except when code phase matching occurs is used as digital codes used in said time hopping modulation.

* * * * *